(12) United States Patent
Mellow et al.

(10) Patent No.: US 9,357,280 B2
(45) Date of Patent: May 31, 2016

(54) APPARATUS HAVING AN ACOUSTIC DISPLAY

(75) Inventors: Timothy J. Mellow, Farnham (GB); Zoran Radivojevic, Cambridge (GB); Leo Mikko Johannes Karkkainen, Helsinki (FI); Koray Ozcan, Farnborough (GB); Johan Lars Bergquist, Tokyo (JP)

(73) Assignee: Nokia Technologies Oy, Espoo (FI)

( * ) Notice: Subject to any disclaimer, the term of this patent is extended or adjusted under 35 U.S.C. 154(b) by 708 days.

(21) Appl. No.: 13/642,191

(22) PCT Filed: Apr. 20, 2010

(86) PCT No.: PCT/IB2010/000879
§ 371 (c)(1),
(2), (4) Date: Dec. 3, 2012

(87) PCT Pub. No.: WO2011/132012
PCT Pub. Date: Oct. 27, 2011

(65) Prior Publication Data
US 2013/0077810 A1    Mar. 28, 2013

(51) Int. Cl.
*H04R 1/02* (2006.01)
*H04N 5/64* (2006.01)
*H04R 1/32* (2006.01)
*G06F 3/01* (2006.01)
*H04R 7/04* (2006.01)
*H04M 1/03* (2006.01)
*H04R 1/40* (2006.01)

(52) U.S. Cl.
CPC ............... *H04R 1/028* (2013.01); *H04N 5/642* (2013.01); *H04R 1/323* (2013.01); *G06F 3/016* (2013.01); *H04M 1/03* (2013.01); *H04R 1/023* (2013.01); *H04R 1/403* (2013.01); *H04R 7/045* (2013.01); *H04R 2201/401* (2013.01); *H04R 2217/03* (2013.01); *H04R 2440/05* (2013.01); *H04R 2499/11* (2013.01); *H04R 2499/15* (2013.01)

(58) Field of Classification Search
CPC ............... H04R 2499/15; H04R 7/045; H04R 2499/11; H04R 2440/05; H04R 1/028; H04R 1/323; H04R 1/403; H04R 2201/401; G06F 3/016; H04M 1/03; H04N 5/642
USPC ........................................................ 381/388
See application file for complete search history.

(56) References Cited

U.S. PATENT DOCUMENTS

| 6,427,017 | B1 | 7/2002 | Toki ............................... 381/190 |
| 2002/0064290 | A1* | 5/2002 | Reynaga et al. ............... 381/152 |

(Continued)

FOREIGN PATENT DOCUMENTS

JP    2007300578 A    11/2007

*Primary Examiner* — Matthew Eason
*Assistant Examiner* — Sean H Nguyen
(74) *Attorney, Agent, or Firm* — Harrington & Smith

(57) ABSTRACT

An apparatus including an electronic display and a stationary part, the stationary part configured to overlie the display face of the electronic display such that the display face of the electronic display is positioned behind the stationary part, the electronic display/display face configured to vibrate with respect to the stationary part, vibration of the electronic display/display face configured to displace air adjacent to the plane of the electronic display to generate sound waves in the direction of the stationary part, wherein the stationary part is substantially acoustically transparent and configured such that the sound waves generated by the vibrations are able to radiate through the stationary part.

20 Claims, 4 Drawing Sheets

(56) References Cited

U.S. PATENT DOCUMENTS

| | | | |
|---|---|---|---|
| 2003/0002697 A1 | 1/2003 | Mellow | 381/190 |
| 2006/0012559 A1 | 1/2006 | Kang | 345/108 |
| 2007/0132911 A1 | 6/2007 | Fujiwara et al. | 349/58 |
| 2008/0085019 A1 | 4/2008 | Wagenaars et al. | 381/152 |
| 2009/0062686 A1* | 3/2009 | Hyde et al. | 600/558 |
| 2009/0154756 A1* | 6/2009 | Eaton et al. | 381/388 |
| 2010/0033412 A1 | 2/2010 | Fratti | 345/87 |
| 2010/0137540 A1* | 6/2010 | Ito et al. | 526/279 |
| 2011/0128245 A1* | 6/2011 | Andoh et al. | 345/173 |

* cited by examiner

APPARATUS HAVING AN ACOUSTIC DISPLAY

TECHNICAL FIELD

The present disclosure relates to the field of acoustic displays, associated apparatus, methods and computer programs, and in particular concerns an apparatus and methods for controlling the directionality of generated sound waves. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/embodiments may provide one or more audio/text/video communication functions (e.g. telecommunication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

As portable electronic devices get smaller and smaller, the size of the functional components is forced to decrease. In addition, there is currently a demand for larger displays which enable a greater amount of information to be viewed at a given time. The combination of smaller devices and larger displays puts pressure on device manufacturers to reduce the size of loudspeakers. Unfortunately, little further size reduction can be achieved with conventional loudspeakers without sacrificing audio performance. At the moment, the performance is adequate for speech, but expectations are set to increase for music. With current mobile phones, the sound is often routed through the back or sides of the housing due to a lack of space on the front of the device, thereby compromising the audio performance further.

To overcome this issue, some manufacturers have started replacing conventional loudspeakers with integrated display speakers. With integrated display speakers, the display, the display cover, or the display and display cover in combination, serve as the loudspeaker diaphragm. In these devices, actuators are used to vibrate the display/cover to create pressure waves in the adjacent air. US2005/0226455A1 discloses a vibrating display; EP1617703A2, WO2006/038176A1 and WO2009/017278A1 disclose vibrating display covers; and EP1827057A2, GB2360901A and EP1912469A1 disclose vibrating display/display cover combinations.

Whilst integrated display speakers have demonstrated some success, they are not without problems. One such problem is associated with the reflection of light from the external surface of the display/cover. When the display/cover vibrates, reflections on the external surface also vibrate and distract the user, thereby having a negative influence on the quality of the displayed image. In particular, vibrations of the display/cover are more visible at low frequencies (<400 Hz) due to the large excursion at the centre of the display/cover.

Further development of integrated display speakers has led to the discovery of the distributed mode loudspeaker (DML). The DML is a flat panel display speaker in which sound is produced by inducing uniformly distributed vibration modes in a flexible display panel. This is in contrast to most other types of speaker which produce sound by inducing pistonic motion in the diaphragm. The advantages of DML speakers are that they are flat, they exhibit good frequency response provided that the panel is large enough, they are able to produce stereo sound from a single panel, and can achieve broad sound dispersion. However, these speakers also suffer from the above-mentioned reflection issue, and additionally, only work well with large panel displays (e.g. TV screens) where the vibration modes are so dense that the user does not notice them. As the display size is reduced, the density of vibration modes decreases, which results in greater distortion and a poorer frequency response.

Another issue with device loudspeakers is the directionality of the generated sound. In certain situations, a user may wish to use his phone in integrated hands free (IHF) or speakerphone mode. This situation may arise, for example, if the user wants to discuss on-screen content with another party during a telephone call. In this scenario, earpiece mode is impractical because holding the phone against the ear would prevent the user from viewing the display. In addition, the use of earphones may be inconvenient.

In IHF mode, a user might want the sound to exit the loudspeaker omnidirectionally so that other people are able to hear the audio output. This may be the case where the user is listening to music or involved in a conference call. In other situations, however, the user may prefer some privacy. For example, if the user is discussing sensitive or personal matters over the phone, he may not want other people in the vicinity to hear both sides of the conversation.

In all wave-producing sources, the directionality (or directivity) is dependent on the size of the source relative to the wavelengths generated. The larger the source with respect to the wavelength of the sound waves, the greater the directionality. Many current devices provide little directional discrimination because the sound exits the housing via small holes. One method of improving the directionality is therefore to increase the size of the source. With electronic devices, however, increasing the size of the loudspeaker inhibits miniaturisation of the device. The ability to control the directionality of the audio output in IHF mode without hindering miniaturisation of the device would therefore be advantageous.

The apparatus and associated methods disclosed herein may or may not address one or more of the issues described above.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

According to a first aspect, there is provided an apparatus comprising an electronic display and a stationary part, the stationary part configured to overlie the display face of the electronic display such that the display face of the electronic display is positioned behind the stationary part, the electronic display/display face configured to vibrate with respect to the stationary part, vibration of the electronic display/display face configured to displace air adjacent to the plane of the electronic display to generate sound waves in the direction of the stationary part, wherein the stationary part is substantially acoustically transparent and configured such that the sound waves generated by the vibrations are able to radiate through the stationary part.

The term "vibration" with respect of the movement of the electronic display/display face may encompass any (e.g. regulated) oscillatory movement of the electronic display/display face towards or away from the stationary part which would lead to the generation of (e.g. particular defined) sound waves (e.g. so that a user can listen to (e.g. music/voice) audio from a portable electronic apparatus/device).

The electronic display/display face may be configured to display visual content to a user of the apparatus. The stationary part may be configured to protect the electronic display/display face of the electronic display.

The stationary part may comprise a plurality of holes. The dimensions of the holes may be chosen such that the holes are substantially invisible to the naked eye. One or both of the number of holes and the dimensions of the holes may be chosen to control the vibration modes of the electronic display/display face. The dimensions of the holes may be chosen to minimise accumulation within the holes of one or more of the following: dirt, skin, dust, moisture, and oil. The stationary part may comprise a coating configured to repel one or more of the following: dirt, skin, dust, moisture, and oil.

The apparatus may comprise one or more actuators configured to vibrate the electronic display/display face. The one or more actuators may be configured to vibrate the electronic display/display face based on an audio signal.

The apparatus may comprise an additional stationary part positioned behind the electronic display. The additional stationary part may be substantially acoustically transparent. The additional stationary part may be configured such that the sound waves generated by the vibrations are able to radiate through the additional stationary part. The acoustic transparency of the additional stationary part may be substantially the same, less, or more than the acoustic transparency of the stationary part e.g. to provide a directional affect, provide more privacy to a user, less disturbance to neighbouring non-users.

The stationary part, additional stationary part and the electronic display may be electrically charged. The stationary part and additional stationary part may have opposite polarities. The stationary part and additional stationary part may be configured to attract and repel the electronic display based on their respective polarities.

The electronic display may comprise two electret membranes. Each electret membrane may be configured to store electrical charge.

The polarities of the stationary part and additional stationary part may be controlled by an external polarising supply. The external polarising supply may be configured to polarise the stationary part and additional stationary part based on an audio signal. The apparatus may comprise an external polarising supply. The external polarising supply may be configured to polarise the electronic display based on an audio signal.

The stationary part and additional stationary part may be configured to produce a dipole radiation pattern.

The additional stationary part may comprise an enclosure. The enclosure may be configured to prevent sound waves generated at the rear of the electronic display from interacting with sound waves generated at the front of the electronic display. The enclosure may comprise an air-absorbing material.

The enclosure may comprise a sliding part and a non-sliding part. The sliding part and the non-sliding part may each contain a plurality of holes. The sliding part may be configured to slide between a first position in which the holes of the sliding part are aligned with the holes of the non-sliding part part to allow the sound waves to radiate through the enclosure, and a second position in which the holes of the non-sliding part are covered by the material of the sliding part to prevent the sound waves from radiating through the enclosure.

The electronic display/display face may comprise at least two segments. Each segment may be configured to vibrate and generate sound waves independently of the other segments. The vibration of each segment may be driven by a separate actuator. The stationary part and additional stationary part may be partitioned into sections. Each section may be configured to attract and repel a corresponding segment of the electronic display.

The sound waves generated by the different segments may be configured to interact with one another to form an interference pattern to increase the directionality of the radiated sound. The generated sound waves may comprise both an ultrasonic wave and an audible wave. The audible wave may be configured to modulate the ultrasonic wave to increase the directionality of the radiated sound.

The stationary part may comprise touchscreen technology. The touchscreen technology may be configured to allow a user of the apparatus to interact directly with content shown on the electronic display/display face by touching the stationary part.

The stationary part may comprise haptic technology. The haptic technology may be configured to provide tactile feedback to a user of the apparatus when the user touches the stationary part.

The electronic display may comprise one or more of the following display technologies:

organic LED, inorganic LED, electrochromic, electrophoretic, and electrowetting technology.

According to a further aspect, there is provided a portable electronic device comprising any apparatus described herein. The apparatus may be a module for a portable electronic device.

According to a further aspect, there is provided a method of generating sound waves, the method comprising:
  using an apparatus, the apparatus comprising an electronic display and a stationary part, the stationary part configured to overlie the display face of the electronic display such that the display face of the electronic display is positioned behind the stationary part, the electronic display/display face configured to vibrate with respect to the stationary part, vibration of the electronic display/display face configured to displace air adjacent to the plane of the electronic display to generate sound waves in the direction of the stationary part, wherein the stationary part is substantially acoustically transparent and configured such that the sound waves generated by the vibrations are able to radiate through the stationary part; and
  vibrating the electronic display/display face of the electronic display to generate sound waves to be radiated through the stationary part.

According to a further aspect, there is provided a method of assembling an apparatus for generating sound waves, the method comprising:
  providing an electronic display and a stationary part, the stationary part being substantially acoustically transparent;
  positioning the electronic display behind the stationary part such that the stationary part overlies the display face of the electronic display; and configuring the electronic display/display face to vibrate with respect to the stationary part to displace air adjacent to the plane of the electronic display and generate sound waves to be radiated through the stationary part.

According to a further aspect, there is provided a computer program for controlling the generation of sound waves using an apparatus, the apparatus comprising an electronic display and a stationary part, the stationary part configured to overlie the display face of the electronic display such that the display face of the electronic display is positioned behind the stationary part, the electronic display/display face configured to vibrate with respect to the stationary part, vibration of the electronic display/display face configured to displace air adjacent to the plane of the electronic display to generate sound waves in the direction of the stationary part, wherein the stationary part is substantially acoustically transparent and configured such that the sound waves generated by the vibrations are able to radiate through the stationary part, the computer program comprising code configured to control vibration of the electronic display/display face to generate sound waves to be radiated through the stationary part.

According to a further aspect, there is provided an apparatus comprising an electronic display and a stationary display cover, the stationary display cover configured to overlie the display face of the electronic display such that the display face of the electronic display is positioned behind the stationary display cover, the electronic display/display face configured to vibrate with respect to the stationary display cover, vibration of the electronic display/display face configured to displace air adjacent to the plane of the electronic display to generate sound waves in the direction of the stationary display cover, wherein the stationary display cover is substantially acoustically transparent and configured such that the sound waves generated by the vibrations are able to radiate through the stationary display cover.

According to a further aspect, there is provided an apparatus comprising a means for displaying and a means for covering, the means for covering configured to overlie and be stationary with respect to the means for displaying such that the means for displaying is positioned behind the means for covering, the means for displaying configured to vibrate with respect to the means for covering, vibration of the means for displaying configured to displace air adjacent to the means for displaying to generate sound waves in the direction of the means for covering, wherein the means for covering is substantially acoustically transparent and configured such that the sound waves generated by the vibrations are able to radiate through the means for covering.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS/EMBODIMENTS

A loudspeaker is an electroacoustic transducer that converts an electrical signal into sound. The speaker vibrates in accordance with variations in the electrical signal, causing the air particles around it to move. When the speaker moves forwards and backwards, the air pressure increases and decreases accordingly. In this way, the speaker sends a wave of pressure fluctuation through the air as a travelling disturbance. When the fluctuation reaches our ears it causes the eardrum to vibrate back and forth, a motion which our brains interpret as sound.

We hear different sounds from different vibrating objects because of variations in sound wave frequency and air pressure level. A higher frequency simply means that the air pressure is fluctuating faster. We register this as a higher pitch. Air pressure level is the amplitude of the sound wave, which determines how loud the sound is. Sound waves with greater amplitudes move our ear drums more, and we register this sensation as a higher volume.

Loudspeakers are the most variable elements in a modern audio system and are usually responsible for most distortion and audible differences when comparing sound systems.

Figure 1A:
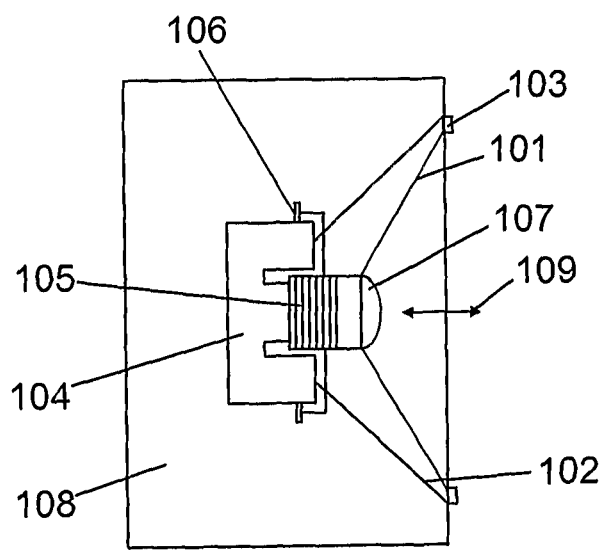
FIG. 1a illustrates schematically a conventional loudspeaker.

A conventional loudspeaker is shown in FIG. 1a, and comprises a diaphragm 101, a frame 102, a suspension 103, a magnet 104, a voice coil 105, an audio signal input 106, a dust cap 107, and an enclosure 108. The speaker produces sound waves by rapidly vibrating the diaphragm 101. The diaphragm 101 is flexible (usually made of paper, plastic or metal) and is attached at its wide end to the suspension 103. The suspension 103 is a rim of flexible material that allows the diaphragm 101 to move, and is attached to the frame 102 of the speaker. The narrow end of the diaphragm 101 is connected to the voice coil 105, which itself is attached to the frame 102 by a ring of flexible material called a spider (not shown). The spider holds the voice coil 105 in position, but allows it to move back and forth freely. The dust cap 107 simply prevents dust particles from reaching the components of the loudspeaker.

The voice coil 105 is positioned in the constant magnetic field of the magnet 104. When a current flows though the voice coil 105, a force acts upon the voice coil, the direction of which depends upon the direction of the current in accordance with Fleming's left hand rule. In this way, an alternating current in the voice coil 105 can be used to reverse the force between the voice coil 105 and the magnet 104 repeatedly. This pushes the voice coil 105 back and forth rapidly like a piston.

When the coil 105 moves, it pushes and pulls on the diaphragm 101 (as indicated by the arrows 109). This causes vibration of the air in front of (and behind) the speaker, creating sound waves. The electrical audio signal can also be interpreted as a wave. The frequency and amplitude of this wave, which represents the recorded sound wave, dictates the rate and distance that the voice coil 105 moves. This in turn determines the frequency and amplitude of the sound waves produced by the diaphragm 101.

Different sizes of speaker are better suited for different frequency ranges. For this reason, loudspeaker units typically divide a wide frequency range between multiple speakers. The largest speakers are called "woofers", and are designed to produce low frequency sounds. "Tweeters" are much smaller units designed to produce the highest frequencies. Midrange speakers produce a range of frequencies in the middle of the sound spectrum. To faithfully reproduce the recorded sound, the audio signal needs to be broken up into the different frequency ranges that are handled by each type of speaker. This is performed by the speaker crossover circuit.

As shown in FIG. 1a, conventional loudspeakers are often housed in an enclosure 108. A loudspeaker enclosure 108 is a purpose-built cabinet in which the speakers (drivers) and associated electronic hardware (such as the crossover circuit and amplifiers) are mounted. Enclosures 108 may vary in design, from simple wooden boxes, to complex cabinets that incorporate specialised materials, internal baffles, ports, and acoustic insulation.

The primary role of the enclosure 108 is to prevent sound waves generated by the rear-facing surface of the diaphragm 101 from interacting with sound waves generated by the front-facing surface of the diaphragm 101. Since the forward and rearward generated sounds are out of phase with one another, any interaction between the two results in cancellation of the acoustic output at low frequencies, producing an approximately 6 dB roll-off per octave below a cut-off frequency at which the path-length between the rear and front of the diaphragm is approximately one-quarter wavelength. The enclosure 108 also plays a role in managing vibration induced by the speaker frame 102 and moving air mass within the enclosure 108, as well as heat generated by the voice coil 105 and amplifiers.

Figure 1B:
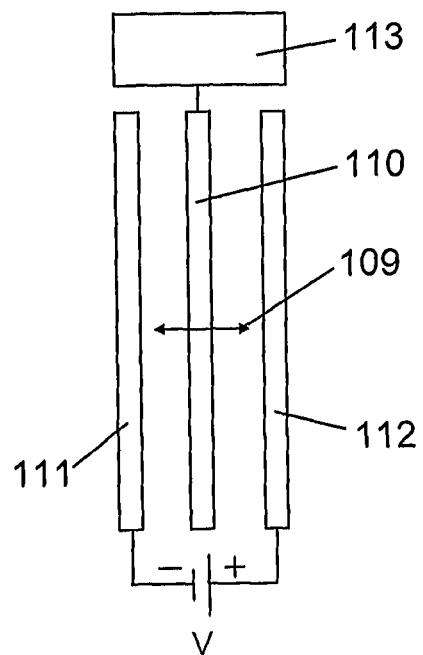
FIG. 1b illustrates schematically an electrostatic loudspeaker.

Another type of speaker known as an "electrostatic loudspeaker" is shown schematically in FIG. 1b. Electrostatic loudspeakers vibrate air with a large, thin, conductive diaphragm 110. The diaphragm 110 is suspended between two stationary conductive panels 111, 112 that are statically charged with opposite polarities. The panels 111, 112 create an electric field between them. The audio signal 113 causes a current to flow through the diaphragm 110 in alternating directions, rapidly switching the polarity of the diaphragm 110. When the diaphragm 110 is positively charged, it is drawn (as indicated by the arrows 109) towards the negative panel 111. When the diaphragm 110 is negatively charged, it is drawn towards the positive panel 112. In this way, the diaphragm 110 rapidly vibrates the air adjacent to it. Instead of applying the audio signal 113 to the diaphragm 110, some electrostatic speakers apply the audio signal 113 to the stationary panels 111, 112 and keep the polarity of the diaphragm 110 constant.

Since the diaphragm 110 has such a low mass, it responds very quickly and precisely to changes in the audio signal 113. This makes for clear and accurate sound reproduction. The diaphragm 110 does not move a great distance, however. As a result, it is relatively ineffective at producing lower frequency sounds, although increasing the diaphragm area can compensate for this. For this reason, electrostatic speakers are usually paired with a woofer to boost the low frequency range.

Figure 1C:
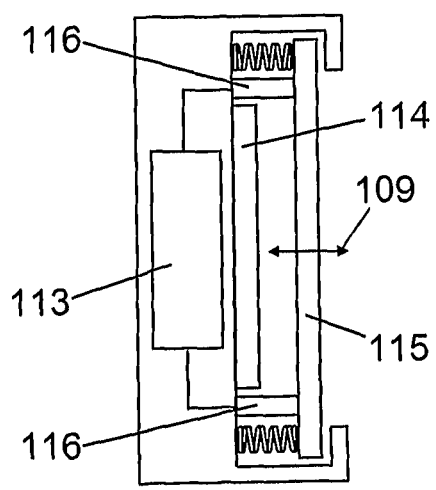
FIG. 1c illustrates schematically an integrated display speaker.

An integrated display speaker is illustrated in FIG. 1c. As described in the background section, these speakers induce vibrations in the display 114, the display cover 115 (as indicated by the arrows 109), or the display 114 and display cover 115 in combination to generate sound waves. In the example illustrated, actuators 116 are used to induce vibrations in the display cover 115 in response to the audio signal 113 whilst the display 114 itself remains stationary. By combining the loudspeaker and display, the performance-related problems associated with miniaturisation of conventional loudspeakers are negated. In actual fact, the size of the speaker diaphragm is effectively increased, thereby providing greater directionality and an improved response at lower frequencies. Also, the fact that the sound comes from the viewing area leads to greater audio-visual correspondence and a more natural user experience. Furthermore, as the sound is radiated directly at the user rather than being routed through the back and sides of the device, distortion of the audio signal 113 is reduced.

Figure 1D:
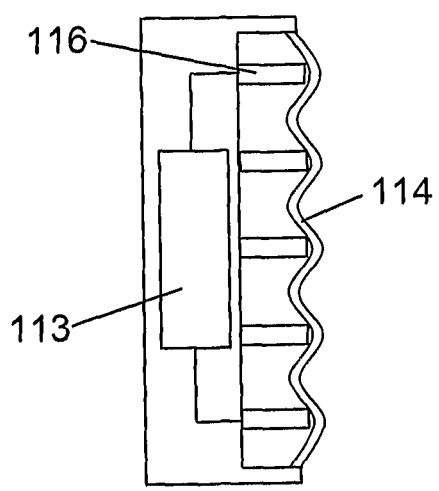
FIG. 1d illustrates schematically a distributed mode loudspeaker.

A distributed mode loudspeaker (DML) is shown in FIG. 1d. These speakers use strategically positioned actuators 116 (or exciters) to convert an electrical audio signal 113 into force, which in turn produces bending waves in a flexible display panel 114 (or in the display cover 115, or in both the display 114 and the display cover 115). These bending waves generate sound waves which travel from the loudspeaker to the listener. In order for DML speakers to work, the display 114/cover 115 must be able to support multiple bending resonances at once. This is achievable using specially-developed materials not normally associated with conventional loudspeaker diaphragms 101.

As discussed earlier, however, existing display speakers suffer from the reflections of light at the external surface of the display 114/cover 115. Directionality of the generated sound waves is also a concern. There will now be described an apparatus and associated methods that may or may not overcome one or both of these issues.

FIGS. 2a-e illustrate schematically an integrated display speaker in various configurations according to the present disclosure. The integrated display speaker may be used with portable electronic devices, including portable telecommunication devices.

In the first configuration (FIG. 2a), an electronic display 214 is positioned behind a stationary part 217 (which may be a stationary cover screen). The display/display face 214 is configured to display visual content to a user positioned in front of the apparatus, whilst the stationary part 217 is configured to protect the electronic display 214 from direct touch or other external forces. In each of the configurations shown in FIGS. 2a-2e, there may or may not be additional apparatus between the electronic display 214 and the stationary part 217 (e.g. additional layers of material).

The electronic display 214 serves as a speaker diaphragm and is configured to vibrate with respect to the stationary part 217, vibration of the electronic display 214 used to displace air adjacent to the plane of the display 214. As with other types of loudspeaker, the displacement of air results in the generation of sound waves in front of 218 and behind 219 the electronic display 214. To allow a user to hear the generated sound waves, the stationary part 217 is configured to be substantially acoustically transparent. This enables the sound waves to radiate through the stationary part 217 and reach the user's ears. Furthermore, to enable the user to view the visual content shown on the electronic display 214, the stationary part 217 also needs to be substantially optically transparent. The fact that the stationary part 217 does not vibrate helps to overcome the problem of changing light reflections. As described in the background section, these reflections can distract the user, thereby having a negative influence on the quality of the displayed image.

To achieve some level of acoustic transparency, the stationary part 217 may comprise a plurality of holes 220 (or perhaps even a single hole). The dimensions of the holes 220 may be chosen such that the holes 220 are substantially invisible to the naked eye. The dimensions of the holes 220 may also be chosen to minimise accumulation within the holes 220 of dirt, skin, dust, moisture or oil. This latter feature is important if the apparatus comprises part of a portable electronic device, such as a portable telecommunications device. Such devices are usually handheld and therefore in direct contact with the user's skin, which increases the transfer of the above-mentioned particles and fluids. Ideally, the diameter of the holes 220 should be less than 0.05 mm so that they cannot be seen by the user (and therefore do not detract from the visual content of the electronic display 214), and do not get clogged up with particles or fluids. This is smaller than the pixel diameter of most modern displays. To further reduce the accumulation of particles and fluids, the stationary part 217 may comprise a coating 221 to help repel particles and fluids. Various nano coatings 221 have been developed which have self-cleaning properties and may be applied to the stationary part 217.

The coating may be hydrophobic, oleophilic, and/or scratch resistant. For example, the coating may comprise self-cleaning glass which is capable of preventing the build up of dirt through photocatalytic decomposition. The self-cleaning glass may comprise titanium dioxide. Examples of commercially available self-cleaning glass (which may be suitable for use with the present apparatus) include: Pilkington Activ™ by Pilkington, SunClean™ by PPG Industries, Neat Glass™ by Cardinal Glass Industries, SGG Aquaclean™ by Saint-Gobain, and Bioclean™ by Saint-Gobain. Another example of a commercially available coating which may be suitable for use with the present apparatus is DFI™ by Diamond Fusion International, Inc.

Another consideration with regards to the hole dimensions is acoustic resistance. In the present sense, acoustic resistance is the opposition that the stationary part 217 provides against the flow of sound waves, which affects the vibration of the electronic display 214 positioned behind the stationary part 217. By using a specific number of holes 220, and choosing specific hole dimensions, it is possible to control the vibration modes of the display 214, therefore allowing a flat frequency response to be achieved.

A number of different techniques may be used to cause vibration of the electronic display 214. For example, the electrodynamic setup used by conventional loudspeakers (as described with reference to FIG. 1*a*) may be employed. Additionally or alternatively, one or more actuators 116 may be used to vibrate the display 214 (as described with reference to FIG. 1*c*). These actuators 116 may be pneumatic, hydraulic, electric, magnetic or piezoelectric actuators, and may be configured to convert an electrical signal into linear motion. This allows the audio signal 213 to drive the display 214. Similarly, it would also be possible to use a flexible display and generate bending waves using one or more exciters, as per the distributed mode loudspeaker (as described with reference to FIG. 1*d*).

Figure 2A:
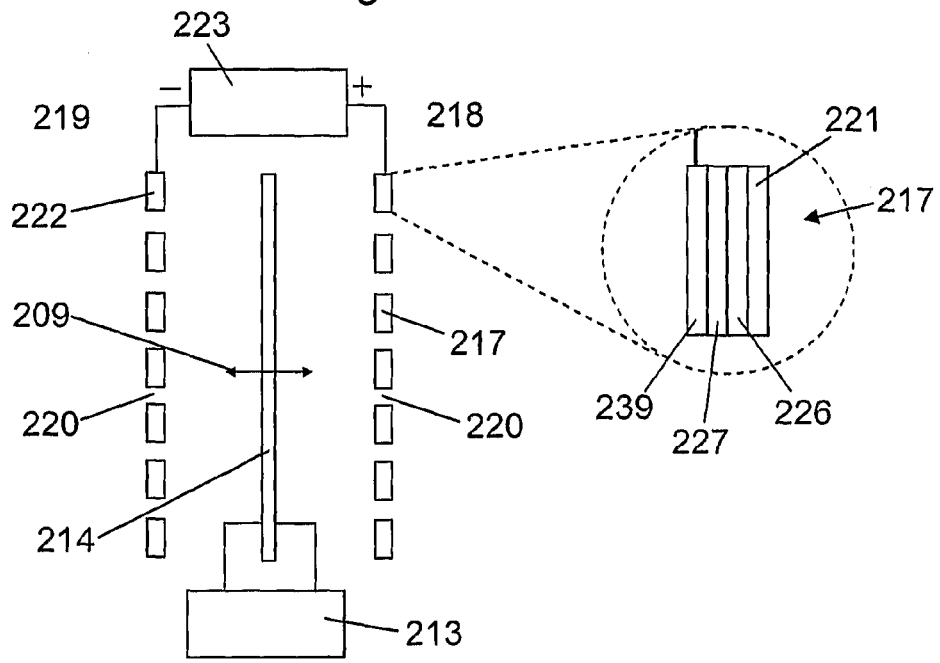
FIG. 2a illustrates schematically an integrated display speaker with an acoustically transparent screen in a dipole configuration according to a first setup.
Figure 2B:
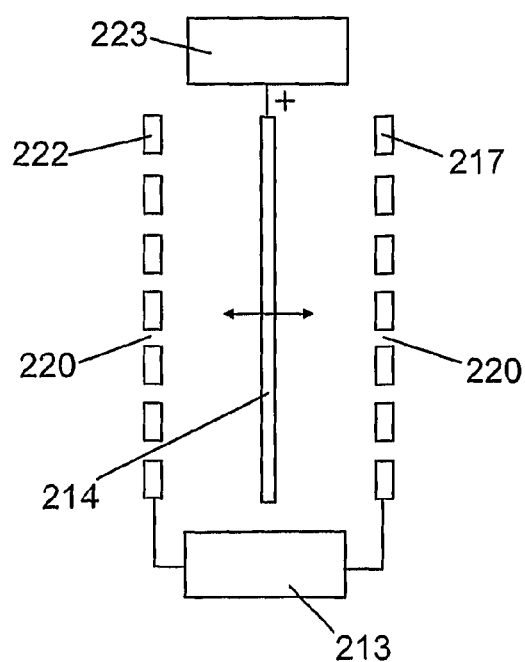
FIG. 2b illustrates schematically an integrated display speaker with an acoustically transparent screen in a dipole configuration according to a second setup.

Whilst the above-mentioned techniques are certainly feasible, a better approach may be to use electrostatic charges to induce vibrations in the electronic display 214. This technique was described with reference to the electrostatic loudspeaker (FIG. 1*b*), and is shown in FIG. 2*a*. One advantage of using electrostatic charges is that the number of moving parts in the speaker is minimised. As with all loudspeakers, the generated sound waves cause mechanical vibration of all objects that they interact with. This includes all parts of the speaker, even the electronic components. If the amplitude of these vibrations is sufficient, audible degradation can occur. By minimising the number of moving parts, these unwanted vibrations are reduced, resulting in a more faithful reproduction of the recorded signal.

In this configuration, the apparatus comprises an additional stationary part 222 positioned behind the electronic display 214. In each of the configurations shown in FIGS. 2*a*-2*e*, there may or may not be additional apparatus between the electronic display 214 and the additional stationary part 222 (e.g. additional layers of material). Like the stationary part 217 in front of the display 214, the additional stationary part 222 is substantially acoustically transparent and configured such that the sound waves generated at the rear 219 of the vibrating display 214 are able to radiate through the additional stationary part 222. Unlike the stationary part 217, the additional stationary part 222 need not be optically transparent as it is not used for display purposes. Also, where the additional stationary part 222 comprises a plurality of holes 220 (or even a single hole), the size or number of holes 220 need not be dictated by the same optical requirements that affect the holes 220 of the stationary part 217.

To cause vibration of the display 214, the stationary part 217, the additional stationary part 222, and the electronic display 214 are electrically charged. The stationary part 217 and the additional stationary part 222 each comprise an electrically conducting layer 239, are oppositely charged (i.e. have opposite polarities), and are configured to attract or repel the electronic display 214 based on their respective polarities (or/and possibly the magnitude of their charges). This electrostatic attraction and repulsion has been described previously with reference to FIG. 1*b*.

Two different scenarios may be considered. In the first scenario (FIG. 2*a*), an audio signal 213 is used to control a flow of current through the electronic display 214, causing the polarity (or/and possibly the magnitude of charge) of the display 214 to change. At the same time, the polarity (or/and possibly the magnitude of charge) of the stationary part 217 and additional stationary part 222 are held constant. In this way, as the polarity of the electronic display 214 varies, the display 214 is pulled back and forth (as indicated by the arrows 209) between the stationary part 217 and additional stationary part 222, generating sound waves as it moves. The power supply used to charge the stationary part 217, additional stationary part 222 and the electronic display 214 may be an external polarising supply 223. A separate external polarising supply may be used to charge the display 214.

Figure 2C:
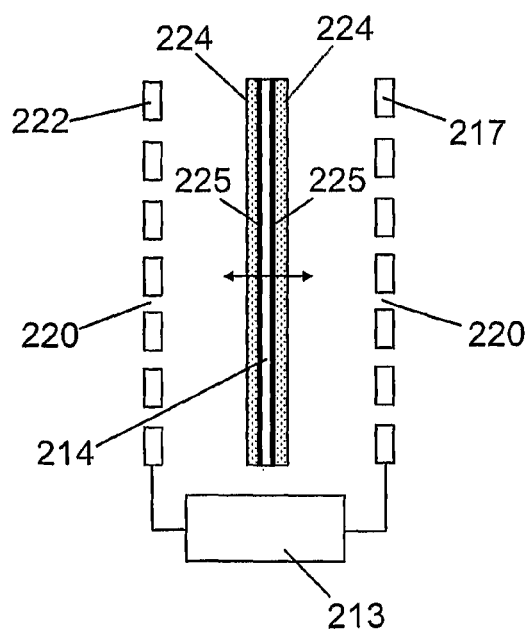
FIG. 2c illustrates schematically an integrated display speaker with an acoustically transparent screen in a dipole configuration according to a third setup.

In the second scenario (FIG. 2*b*), the polarity (or/and possibly the magnitude of charge) of the display 214 may be held constant whilst the polarity (or/and possibly the magnitude of charge) of the stationary part 217 and additional stationary part 222 are varied. As before, external polarising supplies 223 may be used to charge the stationary part 217, additional stationary part 222 and the electronic display 214. Another possibility for maintaining the polarity (or/and possibly the magnitude of charge) of the display, however, is to use electret materials in the display 214 (FIG. 2c). An electret is a dielectric material that has a semi-permanent electric charge or dipole polarisation. An electret generates internal and external electric fields and may be considered to be the electrostatic equivalent of a permanent magnet.

There are two types of electrets: real charge electrets and oriented dipole electrets. Real charge electrets contain excess charge of one or both polarities either on the dielectric's surfaces (i.e. surface charges), or within the dielectric's volume (i.e. volume charges). Oriented dipole electrets, on the other hand, contain an alignment of electic dipoles. Ferroelectric materials are one variant of oriented dipole electrets.

As shown in FIG. 2c, the electronic display 214 may comprises two porous electret membranes 224, one on either side of the display panel 214, to store electrical charge. Each electret membrane 224 may comprise an optically transparent conductive coating 225 (e.g. indium oxide) on the face adjacent to the display panel 214. For low distortion operation, the display 214 should have a constant charge on its surfaces. The conductive coatings 225 of the electret membranes 224, which are in physical contact with the display 214, may help to achieve this by increasing the surface resistivity of the electronic display 214.

If the electrets 224 have the same polarity, the display can be driven by varying the polarity (or/and possibly the magnitude of charge) of the stationary part 217 and additional stationary part 222. The use of an electret loudspeaker has the advantages of being highly efficient, exhibiting low distortion, and providing a flat frequency response. In addition, the absence of a magnet saves space and eliminates other issues such as disturbing RF circuitry or erasing information stored in magnetic storage media.

A disadvantage of electret speakers is the high drive voltage required to vibrate the display 214. On the other hand, the current and power required to operate the device is extremely small (less that 40 pF). In order to eliminate the possibility of electric discharge, a high value series resistor could be included.

The stationary part 217 (and possibly the additional stationary part 222) may comprise touchscreen technology configured to allow a user to interact directly with content shown on the electronic display 214 by touching the stationary part 217. Touch sensitive elements 226 can be seen in the enlarged view of FIG. 2a.

The stationary part 217 (and possibly the additional stationary part 222) may also comprise haptic technology configured to provide tactile feedback to a user when the user touches the stationary part 217 (or additional stationary part 222). The haptic technology may utilise one or more of pneumatic stimulation, vibro-tactile stimulation, electrotactile stimulation, and functional neuromuscular stimulation. Haptic elements 227 can be seen in the enlarged view of FIG. 2a.

When both the stationary part 217 and the additional stationary part 222 are acoustically transparent, sound waves are able to radiate in both the front 218 and rear 219 directions. As a result of this symmetry, the speaker produces a dipole radiation pattern. The term dipole derives from the fact that the radiation pattern consists of two lobes, with equal sound radiated towards the front 218 and rear 219 of the display 214, and no sound radiated towards the sides of the display (i.e. into or out of the page in FIGS. 2a-2e). This scenario arises when the sound waves generated at the front 218 of the electronic display 214 are 180° out of phase with the sound waves generated at the rear 219 of the electronic display 214.

The dipole configuration can be used to improve audio privacy by virtue of the fact that little or no sound is transmitted laterally. This feature may be advantageous to users wishing to discuss sensitive or personal matters over the phone in IHF mode. However, the dipole configuration is only possible with devices that do not have components positioned behind the electronic display 214, such as mobile phone displays with communicator or flip form factors, laptop and desktop computer displays, and televisions, where sound can exit freely from both the front 218 and rear 219 of the display 214 without scattering.

Whilst embodiments in which the electronic display vibrates have been described, the skilled person will appreciate that there could be embodiments (not described) in which not all of the electronic display vibrates. For example, only the display face of the electronic display may vibrate.

Figure 2D:
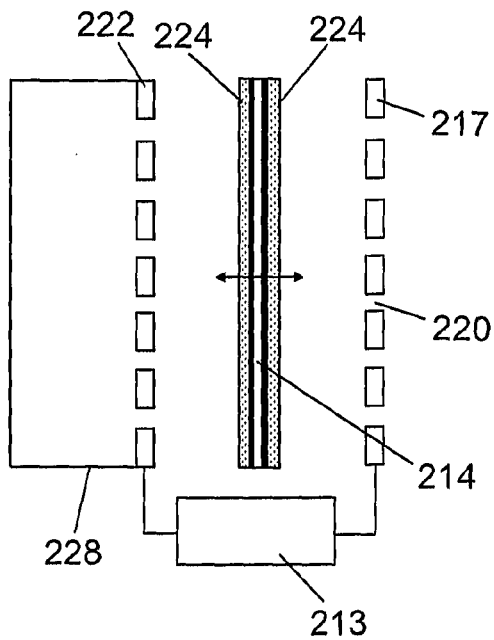
FIG. 2d illustrates schematically an integrated display speaker with an acoustically transparent screen in a monopole configuration.

FIG. 2d shows a different configuration in which the additional stationary part 222 comprises an enclosure 228. The enclosure 228 is configured to prevent sound waves generated at the rear 219 of the electronic display 214 from interacting with sound waves generated at the front 218 of the electronic display 214. In this configuration, the sound generated at the rear 219 of the electronic display 214 exits into the enclosure 228, thereby producing a monopole radiation pattern. Unlike the dipole pattern, the sound waves are scattered by the enclosure 228 and are radiated omnidirectionally from the front 218 of the display 214. Whilst a conventional loudspeaker enclosure could be used to achieve this, they are typically large in size (especially in depth). This inhibits miniaturisation and is therefore undesirable. However, activated carbon and other air-absorbing materials are being developed in order to enable smaller acoustic enclosures. The use of such materials would therefore allow integration of this apparatus into a thin device.

Figure 2E:
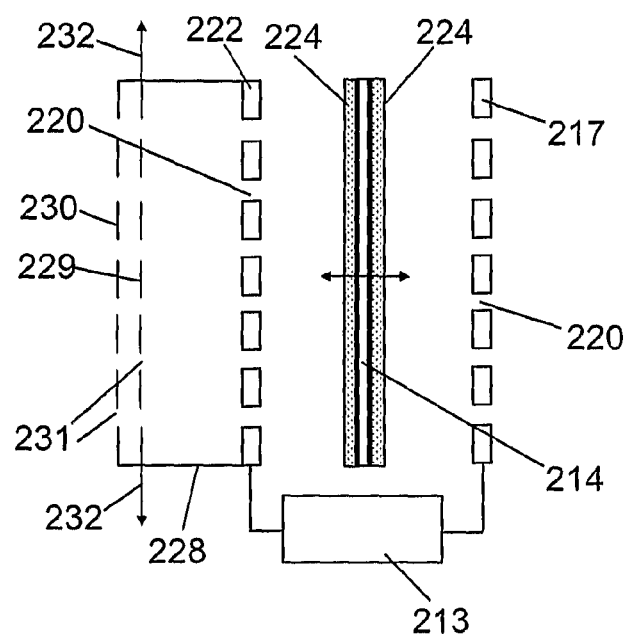
FIG. 2e illustrates schematically an integrated display speaker with an acoustically transparent screen in a selectable monopole or dipole configuration.

FIG. 2e shows another configuration in which the apparatus is capable of producing both a dipole and a monopole radiation pattern. To achieve this, the additional stationary part 222 comprises an enclosure 228. Unlike the enclosure of FIG. 2d, however, this enclosure 228 incorporates a sliding part 229 and a non-sliding part 230, each containing a plurality of holes 231 (or possible a single hole). The sliding part 229 is configured to slide (as indicated by the arrows 232) between a first position in which the holes 231 of the sliding part 229 are aligned with the holes 231 of the non-sliding part 230, and a second position in which the holes 231 of the non-sliding 230 part are covered by the material of the sliding part 229. In the first position, the sound waves are able to radiate through the back of the enclosure 228, but in the second position, are prevented from radiating through the back of the enclosure 228. This feature enables the user to select the dipole pattern when he requires greater audio privacy (where no sound is radiated towards the sides of the display), and select the monopole pattern when he desires greater audio dispersion (where the sound is radiated omnidirectionally).

It is possible to improve the directionality of the audio output further still by segmenting the electronic display 214 (or possibly the display face of the electronic display 214). In this configuration (not shown), each segment may be configured to vibrate and generate sound waves independently of the other segments. This may be achieved by driving the vibration of each segment using separate actuators. Where the vibrations are controlled electrostatically using the stationary part 217 and additional stationary part 222, the stationary part 217 and additional stationary part 222 may be partitioned into sections, each section configured to attract or repel a corresponding segment of the electronic display 214/display face.

By segmenting the electronic display 214, the sound waves generated by the different segments may be configured to interact with one another to form an interference pattern. This technique (known as beam-forming) can be used to increase the directionality of the radiated sound by causing the sound waves to destructively interfere at the sides of the display 214, and constructively interfere at the front 218 and/or rear 219 of the display 214.

Additionally or alternatively, one or more segments may be configured to generate sounds in the ultrasonic range, whilst one or more other segments may be configured to generate sounds in the audible range. The audible wave may be configured to modulate the ultrasonic wave. This technique can be used to increase the directionality of the radiated sound. The method is based on the fact that ultrasound has a wavelength of only a few millimeters, which is far smaller than the size of the source (in this case, the display segment). As a result, the ultrasound travels as an extremely narrow beam. When the ultrasonic wave acts as a carrier wave for the audible wave, the non-linear interaction of ultrasound in air can be used to produce a highly directional audible sound.

Figure 3:
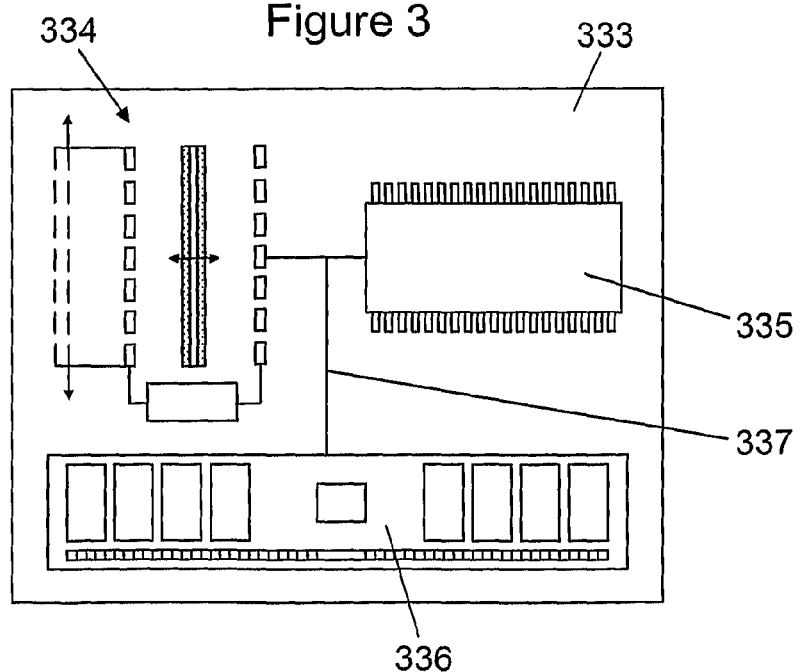
FIG. 3 illustrates schematically a device comprising the apparatus described herein.

FIG. 3 illustrates schematically an electronic device 333 comprising the integrated display speaker 334 described herein. The device also comprises a processor 335 and a storage medium 336, which may be electrically connected to one another by a databus 337. The device 333 may be a portable electronic device, such as a portable telecommunications device.

The integrated display speaker 334 is configured to provide a user with audio and/or visual content. The vibrating display 214 itself may be an organic LED, inorganic LED, electrochromic, electrophoretic, or electrowetting display.

The storage medium 336 is configured to store computer code required to operate the apparatus, as described with reference to FIG. 6. The storage medium 336 may also be configured to store the audio and/or visual content. The storage medium 336 may be a temporary storage medium such as a volatile random access memory, or a permanent storage medium such as a hard disk drive, a flash memory, or a non-volatile random access memory.

The processor 335 is configured for general operation of the device 333 by providing signalling to, and receiving signalling from, the other device components to manage their operation. In particular, the processor 335 is configured to control the generation of sound waves by providing audio signalling 213 to the electronic display 214, the electronic display 214 configured to vibrate based on this audio signalling 213.

Figure 4:
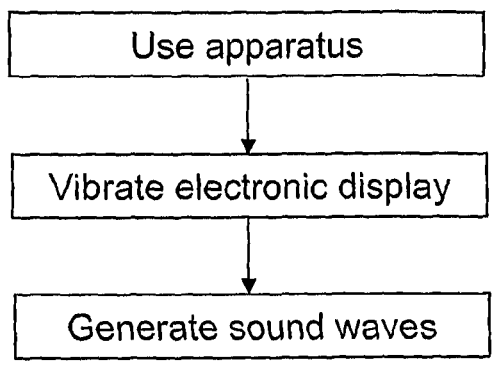
FIG. 4 illustrates schematically a method of generating sound waves.
Figure 5:
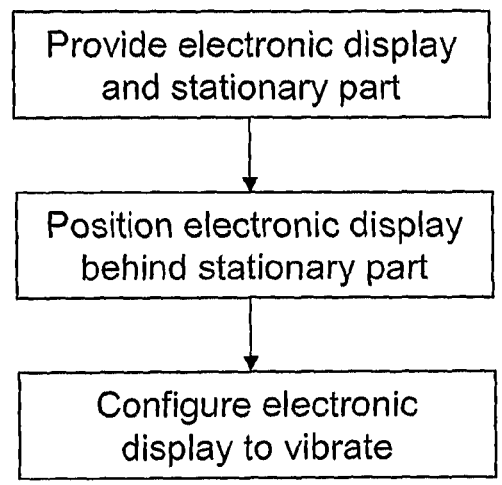
FIG. 5 illustrates schematically a method of assembling an apparatus for generating sound waves.

The key steps of the method used to generate sound waves using the apparatus described herein are illustrated schematically in FIG. 4. Likewise, the key steps of the method used to assemble the apparatus described herein are illustrated schematically in FIG. 5.

Figure 6:
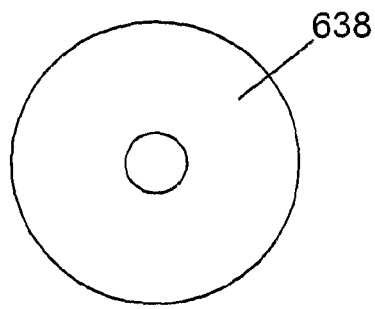
FIG. 6 illustrates schematically a computer readable media providing a program.

FIG. 6 illustrates schematically a computer/processor readable medium 638 providing a computer program according to one embodiment. In this example, the computer/processor readable medium 638 is a disc such as a digital versatile disc (DVD) or a compact disc (CD). In other embodiments, the computer readable medium 638 may be any medium that has been programmed in such a way as to carry out an inventive function. The readable medium 638 may be a removable memory device such as a memory stick or memory card (SD, mini SD or micro SD).

The computer program may comprise code for controlling the generation of sound waves using an apparatus, the apparatus comprising an electronic display 214 and a stationary part 217, the stationary part 217 configured to overlie the display face of the electronic display 214 such that the display face of the electronic display 214 is positioned behind the stationary part 217, the electronic display 214/display face configured to vibrate with respect to the stationary part 217, vibration of the electronic display 214/display face configured to displace air adjacent to the plane of the electronic display 214 to generate sound waves in the direction of the stationary part 217, wherein the stationary part 217 is substantially acoustically transparent and configured such that the sound waves generated by the vibrations are able to radiate through the stationary part 217, the computer program comprising code configured to control vibration of the electronic display 214/display face to generate sound waves to be radiated through the stationary part 217.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It will be appreciated to the skilled reader that any mentioned apparatus, device, server or sensor and/or other features of particular mentioned apparatus, device, server or sensor may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus, device, server or sensor may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus, circuitry, elements, processor or sensor may have other functions in addition to the mentioned functions, and that these functions may be performed by the same apparatus, circuitry, elements, processor or sensor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the terms "signal" or "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising an electronic display and a stationary part, the stationary part configured to substantially overlie a display face of the electronic display to form an air gap between the stationary part and the display face, the electronic display configured to vibrate with respect to the stationary part, vibration of the electronic display configured to displace air adjacent to the plane of the electronic display to generate sound waves in the direction of the stationary part, wherein the stationary part is substantially acoustically transparent and configured such that the sound waves generated by the vibrations are able to radiate through the stationary part;

wherein the electronic display is positioned between the stationary part and an additional stationary part, wherein the additional stationary part is substantially acoustically transparent and configured such that the sound waves generated by the vibrations are able to radiate through the additional stationary part.

2. The apparatus of claim 1, wherein the electronic display is configured to display visual content to a user of the apparatus.

3. The apparatus of claim 1, wherein the stationary part comprises a plurality of holes.

4. The apparatus of claim 3 wherein the diameter of the holes is smaller than the pixel diameter of the electronic display.

5. The apparatus of claim 3 wherein the diameter of the holes and/or the number of holes controls the vibration modes of the electronic display.

6. The apparatus of claim 1, wherein the stationary part comprises a coating configured to repel one or more of the following: dirt, skin, dust, moisture, and oil.

7. The apparatus of claim 1, wherein the apparatus comprises one or more actuators configured to vibrate the electronic display.

8. The apparatus of claim 1, wherein the stationary part, additional stationary part and the electronic display are electrically charged, the stationary part and additional stationary part having opposite polarities and configured to attract and repel the electronic display based on their respective polarities.

9. The apparatus of claim 8, wherein the electronic display comprises two electret membranes each configured to store electrical charge.

10. The apparatus of claim 8, wherein the polarities of the stationary part and additional stationary part are controlled by an external polarising supply, the external polarising supply configured to polarise any of the stationary part, additional stationary part, and the electronic display based on an audio signal provided by the apparatus.

11. The apparatus of claim 1, wherein the stationary part and additional stationary part are configured to produce a dipole radiation pattern.

12. The apparatus of claim 1, wherein the additional stationary part comprises an enclosure configured to prevent sound waves generated at the rear of the electronic display from interacting with sound waves generated at the front of the electronic display.

13. The apparatus of claim 1, wherein the electronic display comprises at least two segments, each segment configured to vibrate and generate sound waves independently of the other segments.

14. The apparatus of claim 13, wherein the at least two segments are configured to interact with one another to form an interference pattern to increase the directionality of the radiated sound or at least one of the at least two segments is configured to generate sounds in an ultrasonic range.

15. The apparatus of claim 12, wherein the enclosure comprises a sliding part and a non-sliding part, each containing a plurality of holes, the sliding part configured to slide between a first position in which the holes of the sliding part are aligned with the holes of the non-sliding part to allow the sound waves to radiate through the enclosure, and a second position in which the holes of the non-sliding part are covered by the material of the sliding part to prevent the sound waves from radiating through the enclosure.

16. The apparatus of claim 1, wherein the acoustic transparency of the additional stationary part is substantially the same, less, or more than the acoustic transparency of the stationary part.

17. The apparatus of claim 1, wherein the additional stationary part is positioned behind the electronic display.

18. The apparatus of claim 12, wherein the additional stationary part is configured to produce a monopole radiation pattern.

19. The apparatus of claim 1, wherein the electronic display comprises a conductive coating.

20. The apparatus of claim 19, wherein the conductive coating is disposed on a porous electret membrane of the electronic display.

\* \* \* \* \*